United States Patent [19]

Lord

[11] 4,301,831

[45] Nov. 24, 1981

[54] PRESSURE REGULATING VALVE WITH DIFFERENTIAL PRESSURE RESPONSE

[75] Inventor: Thomas J. Lord, Dayton, Ohio

[73] Assignee: United Aircraft Products, Inc., Dayton, Ohio

[21] Appl. No.: 131,189

[22] Filed: Mar. 17, 1980

[51] Int. Cl.³ ............................................. F16K 31/365
[52] U.S. Cl. .................... 137/489.5; 137/495; 137/487
[58] Field of Search .............. 137/489.5, 489, 488, 137/495, 487, 486

[56] References Cited

U.S. PATENT DOCUMENTS

| 2,257,171 | 9/1944 | King ................................. | 137/489.5 |
| 2,881,792 | 4/1959 | Spence ............................ | 137/489.5 |
| 3,020,925 | 2/1962 | Randall ........................... | 137/489.5 |
| 3,047,010 | 7/1962 | Rothfuss ......................... | 137/489 |

*Primary Examiner*—Alan Cohan
*Attorney, Agent, or Firm*—J. E. Beringer

[57] ABSTRACT

Valve apparatus including a regulating valve controlling fluid flow through a duct and positionable to produce a regulated downstream pressure from a normally relatively higher upstream pressure. A pilot valve enables a relatively reduced fluid pressure to be used on and in connection with a regulating valve operator. The pilot valve responds to inlet pressure and enables sequential operating steps according to which, in part, the regulating valve moves to a fully open position upon inlet or upstream pressure dropping to a predetermined low value and moves to a fully closed position upon inlet or upstream pressure dropping below the predetermined low value.

8 Claims, 6 Drawing Figures

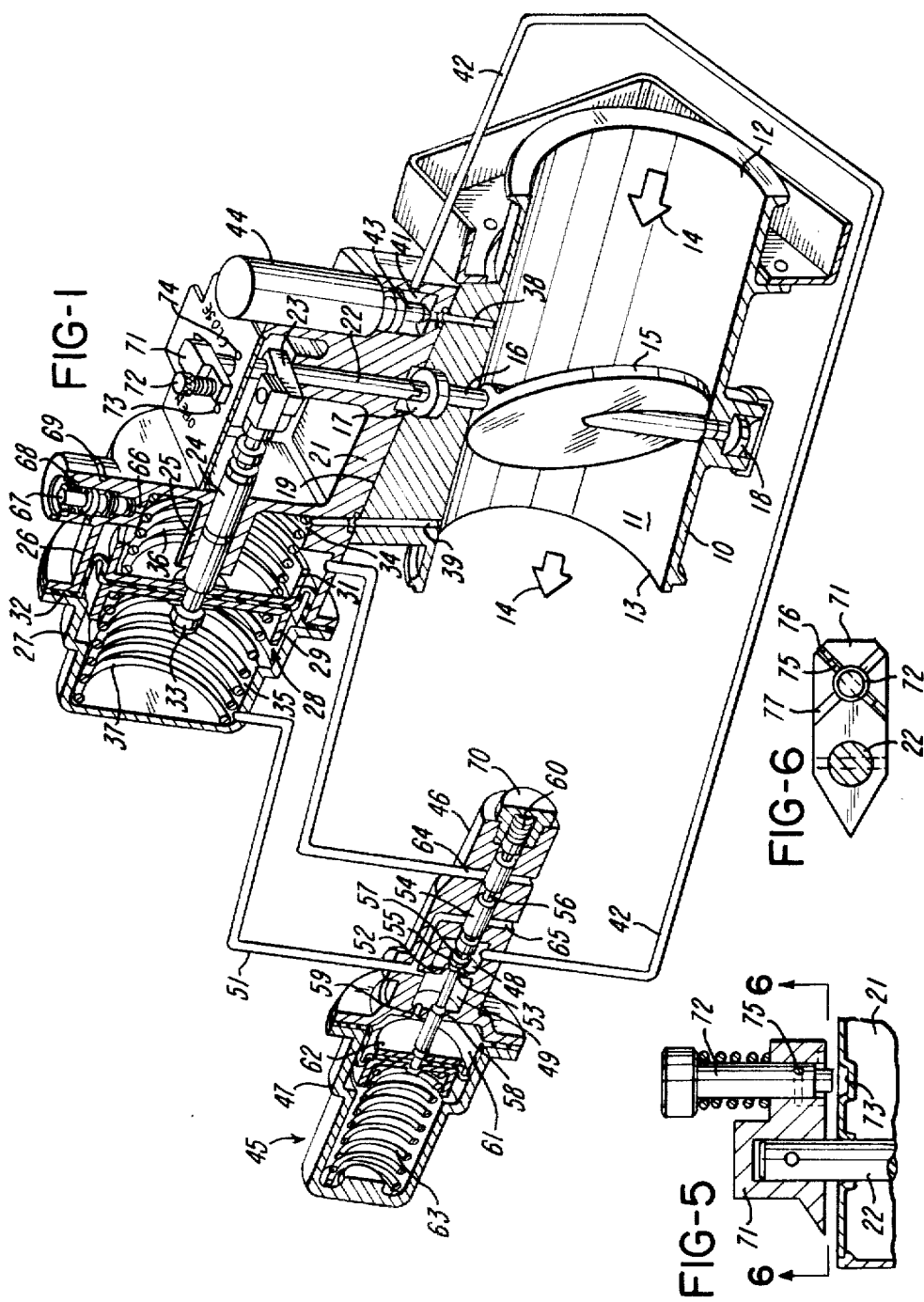

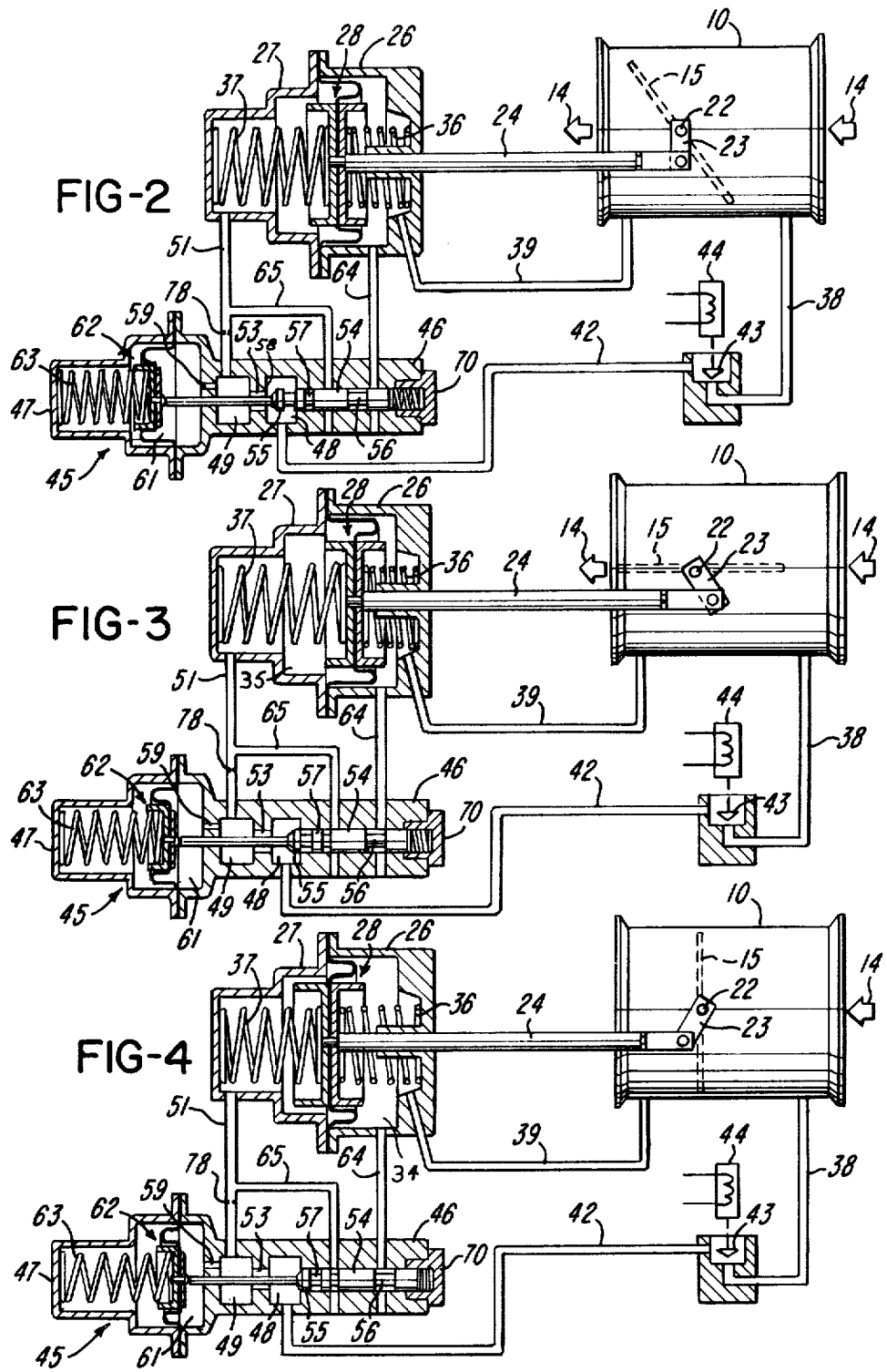

PRESSURE REGULATING VALVE WITH DIFFERENTIAL PRESSURE RESPONSE

BACKGROUND OF THE INVENTION

1. Field of the Invention

This invention relates to pressure regulating valves, and in particular to valves installed in an air flowing duct or the like to provide for delivery of a regulated downstream pressure from an upstream pressure supplied in a normally relatively higher range of pressures. The invention is addressed especially to the meeting of an operational requirement that the valve open the duct more fully to flow therethrough as upstream pressure drops, reaching fully open position at a predetermined low upstream pressure below which continued flow is of no value, and that the valve close the duct to flow therethrough should upstream pressure continue to fall and drop below such predetermined low value.

2. Description of the Prior Art

Pressure regulating valves are known which attempt to establish and maintain a range of reduced downstream pressures. In no instance of which applicant and those others substantively involved in preparation of this application are aware, does the valve apparatus function in sequential steps involving a reversal of valve movement from fully open to fully closed positions while the pressure responded to is changing in a single direction.

SUMMARY OF THE INVENTION

The invention is directed to a solution of the above discussed and related problems of the prior art. In the regulating valve art it provides a valve adapted for installation in an air flow duct and adjustable between open and closed positions therein. Piston means drives the valve and takes up positions related to the differences in upstream and downstream pressure. A pilot valve provides for a relatively low pressure operation of the piston means, and, in responding to upstream pressure, produces a sequence of events in which the piston means moves to one extreme position as upstream pressure drops to a predetermined low value and moves in a reverse sense to an opposite extreme position as upstream pressure continues to drop, falling below the predetermined low value and to zero. The purpose of sequencing is to override the normal valve feed back or regulation process to fully open the valve at low inlet pressures to obtain maximum flow, but to close at still lower inlet pressures which are so low as to be of no benefit. A further purpose is to provide a fail safe condition of closing.

A mechanism external to the valve apparatus indicates the position of the regulating valve and lends itself to manual operation whereby the valve may be set to control positions independently of fluid pressure conditions. In a feature of the invention, the regulating valve is a butterfly valve combined with a valve operator and a pilot valve control in a manner producing a lightweight, compact valve apparatus particularly suited for duct installation.

An object of the invention is to provide a valve apparatus substantially in accordance with the foregoing.

Other objects and structural details of the invention will appear from the following description, when read in connection with the accompanying drawings, wherein:

FIG. 1 is a view in perspective, and in part diagrammatic, of a valve apparatus in accordance with the illustrated embodiment of the invention;

FIGS. 2, 3 and 4 are diagrammatic views showing sequence positions of operation of the valve apparatus;

FIG. 5 is a detail view in cross section of an external indicator and valve operating mechanism; and FIG. 6 is a view of the underside of the mechanism of FIG. 5, being taken substantially along the line 6—6 of FIG. 5.

Referring to the drawings, a valve apparatus in accordance with the illustrated embodiment of the invention comprises a housing 10 adapted for installation in a duct flowing fluid under pressure, for example air. A through bore 11 has what may be termed upstream and downstream ends, 12 and 13 respectively, these designations relating to the attitude or position of the housing as installed in the fluid flowing duct. Thus, in the use of the apparatus, fluid under pressure is admitted to bore 11 at upstream or inlet end 12, flows longitudinally through the bore and exits by way of downstream or outlet end 13. Inlet end 12, it will be understood, communicates with a source of fluid under pressure while outlet end 13 communicates with a pressure fluid chamber or system within which the entering fluid is put to a useful purpose. Valve apparatus of the kind to which this invention generally relates has a utility in systems wherein the pressure of the fluid supplied to inlet 12 is relatively high whereas downstream requirements are for a fluid at a relatively lower pressure. The flow of fluid, which will for convenience hereinafter be referred to as air, is in the direction as indicated by the arrows 14.

Positioned in the bore 11 to control the flow of air therethrough is a valve 15. While various forms of control valves may be employed, the valve 15 in the illustrated instance is a butterfly valve fixed to a shaft 16 mounted transversely in the housing 10 to intersect bore 11. Ends of the shaft 16 have an anti-friction mounting in rolling bearing assemblies 17 and 18. The butterfly valve 15 is a disc-like member movable between a fully closed position (FIG. 4) in which it lies in a plane perpendicular to the axis of bore 11 to a fully open position (FIG. 3) in which it lies in a plane substantially coincident with the axis of bore 11. Between these extremes, the valve may occupy an infinite number of control positions (as shown for example in FIGS. 1 and 2) in which bore 11 is open to greater and lesser extents.

The valve housing 10 has an upper, raised surface 19 to which is seated an auxiliary housing 21. In the housing 21 a shaft 22 has a rotary bearing and is axially aligned with shaft 16, adjacent ends of the shafts having a keyed connection as seen. Shaft 22 is in effect an upward continuation of shaft 16. Made fast thereto is an arm 23 to which is pivotally connected one end of a rod 24. Rod 24 has a longitudinally sliding bearing in an internal housing sleeve 25 and projects through and beyond such sleeve into a cylinder comprises of mating cylindrical segments 26 and 27. In the cylinder structure 26-27 is a piston means 28 comprises of back to back plate portions 29 and 31 and an intermediately positioning rolling diaphragm 32. The latter is secured at its periphery between cylinder segments 26-27. An inner end of rod 24 is made fast to piston means 28, as by means including a nut 33. The piston means 28 accordingly is a part of an operating means for butterfly valve 15, reciprocation of the piston means in its cylinder environment acting through rod 24 and arm 23 to effect rotary turning movements of valve mounting shaft 16 through its extension 22.

In its cylinder environment, the piston means defines on opposite sides thereof pressure chambers 34 and 35, pressure fluid being admitted to and vented from these chambers in a manner to be hereinafter pointed out. In addition, the piston means is subjected to continuously acting unbalanced forces as represented by opposing compression springs 36 and 37. spring 36 is relatively more powerful than spring 37, and, in the absence of other considerations, will move piston means 28 outwardly or in the direction of cylinder segment 27. This being in a direction to move valve 15 toward closed position, spring 36 may be regarded as exerting a valve closing force and spring 37 may be regarded as exerting a valve opening force.

A pressure fluid system, by which fluid pressure is variously communicated to chambers 34 and 35, includes passages 38 and 39 leading from bore 11 upward to and through surface 19. The passages 38 and 39 position on opposite sides of valve 15 and so may be described as communicating with inlet and outlet ends of bore 11 or with areas respectively upstream and downstream of the valve. In auxiliary housing 21 a continuation of passage 38 opens into a chamber 41, while a continuation of passage 39 opens directly into chamber 34. Flow out chamber 41 is by way of a passage 42 and occurs under control of a valve 43 adapted to seat in and close off the open upper end of the continuation of passage 38. A solenoid 44, when energized, lifts valve 43 from its seat and opens flow from passage 38 to passage 42. A deenergized solenoid allows valve 43 to reseat in passage 38 and shut off flow to passage 42.

Passage 42 leads to a pilot valve 45 comprised of a body 46 and a cylindrical extension 47. Body 46 includes a chamber 48 with which passage 42 communicates and a chamber 49, the latter communicating by way of a passage 51 with valve operating means chamber 35. Chambers 48 and 49 are separated by a wall 52 in which is an axial opening 53. The body 46 has a through longitudinal bore in which a slide valve 54 is movable in an endwise sense. The valve 54 includes a conical valve portion 55 in chamber 48 and longitudinally spaced necked portions 56 and 57 serving a purpose hereinafter to be explained. Valve portion 55 controls fluid flow from chamber 48 to chamber 49 by way of opening 53, allowing greater and lesser amounts of fluid to flow thereby as it approaches more closely to and moves more distant from wall 52. The chamber 49 is additionally defined by an end wall 58 in which is aperture 59 communicating chamber 49 with a pressure chamber 61 in cylindrical extension 47. Chamber 61 is in part further defined by a piston means 62 reciprocable in extension 47 and backed by a compression spring 63. A rod-like extension of slide valve 54 has a bearing in end wall 58 and abuts piston means 62. A spring 60 is confined in a closure member 70 at an end of body 46 opposite extension 47 and maintains slide valve 54 in a following relation to piston means 62. Reciprocation of the piston means 62 accordingly effects an endwise motion of slide valve 54.

The bore in valve body 46 accommodating valve 54 is intersected by a passage 64, one end of which opens to ambient surroundings and the other end of which communicates with operating means chamber 34. The same bore is also intersected by a passage 65, one end of which opens to ambient surroundings and the other end of which communicates with operating means chamber 35 by way of passage 51. Flow through passages 64 and 65 is denied by valve 54 except when necked portions 56 and 57 are respectively aligned therewith. Necked portion 56 is longer than necked portion 57 so that passage 64 may be open over a relatively greater part of the travel of valve 54.

In operation of the valve apparatus, solenoid valve means 43-44 functions as an on-off control. With passage 38 closed, none of the relatively high pressure air at bore inlet 12 is admitted to operating means chamber 35. Piston means 28 is under the influence of opposing spring forces 36 and 37, and, as urged by the relatively stronger spring 36, takes up a position closing valve 15. Also, since no inlet pressure is reaching pilot valve 45, air pressure in chamber 61 is at a minimum, allowing spring 63 to position valve 54 so that necked portions 56 and 57 align with passages 64 and 65. At this time, therefore, operating means chambers 34 and 35, and communicating areas, are vented to ambient surroundings.

If solenoid 44 is energized to lift valve 43, inlet or upstream air pressure is communicated through passages 38 and 42 to pilot valve chamber 48. Air flow takes place from chamber 48 to chamber 49, by way of opening 53, and from chamber 49 to pressure chamber 61 and to operating means chamber 35. At this time, therefore, there exists in chamber 35 relatively high pressure inlet air and this, plus the force exerted by spring 37, is sufficient to move piston means 28 inwardly against the urging of spring 36 as augmented by the relatively low downstream pressure admitted to chamber 34 by way of passage 39. At the same time, air pressure in chamber 61 moves piston means 62 outward, deflecting spring 63. This motion misaligns necked valve portions 56 and 57 relative to vent passages 64 and 65 which thereby are closed. This motion serves also to bring conical valve portion 55 into an approaching relation to opening 53 for a throttling effect upon the movement of air from chamber 48 to chamber 49. Under these conditions, the operating means piston 28 moves inwardly, rocking shaft 16 and turning valve 15 out of its fully closed position toward an open position. Upstream and downstream pressures achieve a differential related to the position of adjustment assumed by valve 15 and this position in turn becomes a function of such pressure differential as reflected in chambers 34 and 35. Conical valve portion 55 of pilot valve 45 takes up a position directly related to inlet pressure and provides for operation of the operating means piston 28 at fluid pressure values normally reduced from the pressure values of the fluid supplied inlet 12.

What may be regarded as a normal operating position of the valve apparatus is illustrated in FIGS. 1 and 2 wherein valve 15 is shown in partly open position. Flow through the bore 11 is at this time restricted so that a substantial differential exists on upstream and downstream sides of the valve, with, however, adequate pressure fluid being supplied to the downstream side to perform whatever purpose it is intended that the so regulated pressure should perform. In a continuing normal operation of the apparatus, the parts will remain positioned substantially as illustrated, with butterfly valve 15 assuming various positions between open and closed within an allowable, expected range of inlet pressures. As inlet pressure drops to the low end of the expected, allowable range of inlet pressure, the movements of pilot valve member 54 come sufficiently under the influence of spring 63 that throttling valve portion 55 moves completely away from wall 58 and necked portion 56 moves into a position of alignment with vent passage 64. This position of the parts is illustrated in FIG. 3 wherein it is seen that as a result thereof, operating means chamber 34 is vented of pressure fluid while chamber 35 continues to be supplied with pressure fluid and is not vented, the necked portion 57 being at this time still out of alignment with vent passage 65. The combination of pressure fluid in chamber 35 and the force of spring 37 suffices to overcome spring 36 and valve 15 is moved to the wide open position shown in FIG. 3. At this time, therefore, flow through the bore 11 is relatively unrestricted and the demands upon downstream pressure are attempted to be met by drawing upon the full available upstream pressure.

In the event that upstream pressure drops below a predetermined low value, as for example to a pressure value at which fluid flow would tend to reverse or move from the downstream side of the valve to the upstream side, it is desirable fully to close valve 15. Thus, as the piston means 62 and its actuating spring 63 continue to sense a falling inlet pressure they move valve member 54 through and beyond the position shown in FIG. 3 to a position substantially as shown in FIG. 4. This movement places necked portion 57 of the valve member into alignment with vent passage 65. At the same time, and because of its greater length, necked portion 56 remains in alignment with vent passage 64. With the parts so positioned, therefore, both operating means chambers 34 and 35 are vented to ambient surroundings and piston means 28 is restored to the control of spring 36 which moves piston means 28 outwardly, fully closing valve 15. The parts will remain so positioned until inlet pressure again rises above the predetermined low value. This pressure change is marked by a movement of the valve 15 from a fully closed to a fully open position, as valve member 54 reaches the position of FIG. 3, and, as inlet pressures continue to rise the parts are restored to normal operating positions substantially as shown in FIG. 2.

To avoid overpressurizing operating means chamber 34, auxiliary housing 21 provides an escape passage 66 therefrom. Passage 66 is controlled by a relief valve 67 which, under the urging of a spring 68 maintains passage 66 normally closed. Valve 67 pops up or relieves at a predetermined high pressure and is held in an open position by a retaining ring 69.

The shaft 22 rises upwardly out of auxiliary housing 21 and, externally of the housing, has a pointer arm 71 secured thereto. Designations "open" and "close" are on the exterior of the auxiliary housing and are respectively indicated by the pointer arm 71. By this mechanism, the position of valve 15 in bore 11 can be determined by an exterior inspection. The pointer arm 71 also may be used to rotate the valve 15 to open and closed position manually, in an overriding relation to forces acting on the piston means 28. Since it may be desirable to maintain the valve in a hand adjusted position, a spring urged plunger 72 is carried on the pointer arm 71 at the rear thereof. A reduced lower end of the plunger 72 is adapted to enter detenting recesses 73 and 74 in the housing 21. The plunger 72 carries a transverse pin 75 (FIGS. 5 and 6) adapted to lie either in a relatively deep slot 76 on the underside of pointer arm 71 or in a more shallow recess 77 therein. The plunger normally is rotatively positioned so that pin 75 lies in slot 76. At this time, therefore, plunger 72 clears the upper surface of auxiliary housing 21 and the pointer member can move freely in a rotary sense with shaft extension 22. If the pointer member is turned so that plunger 72 aligns with a recess 73 or recess 74 then the plunger can be depressed so that its reduced lower end enters the aligning recess. This motion is sufficient to carry pin 75 out of slot 76 and position it below the lower surface of the pointer member. If the plunger 72 now is given an approximate one-quarter turn pin 75 will locate in shallow recess 77 locking the depressed plunger into the recess with which it has been engaged. A forceful turn of the plunger will release pin 75 from shallow recess 77 returning it to alignment with slot 76 whereupon the spring force acting on the plunger will retract the pin into the slot and withdraw the reduced lower end of the plunger from the detenting recess.

In the pressure fluid system orifices are installed where desirable to insure a properly distributed fluid flow and consequent operation of the valve apparatus in its intended modes. For example, an orifice 78 in passage 51 (FIGS. 2, 3 and 4) insures a proper distribution of fluid to chamber 61 and allows effective venting of operator means chamber 35. In FIG. 1, orifice 78 is represented by a relatively reduced diameter portion of passage 51 where it opens from chamber 49. Slide valve 54 achieves less than a perfect seal in body 46. Effective orifices accordingly are provided obviating pressure entrapment in the chambers 34 and 35 and communicating spaces.

Valve apparatus according to the invention has been disclosed as functioning in connection with control of flow of pressure fluid through a duct or the like. It will be evident that other applications are possible and that modifications in the structure of the valve apparatus, within concepts of the invention, are also possible and within the invention intent.

What is claimed is:

1. Valve apparatus including a housing and a regulating valve therein, said housing having a pressure fluid inlet and having an outlet for pressure fluid received at said inlet, normally higher pressure fluid being admitted at said inlet and under control of said valve discharging at a relatively lower pressure from said outlet, means for operating said regulating valve between open and closed positions, means applying continuing unbalanced forces to said operating means, the greater force being applied in a direction to close said valve, means for applying inlet and outlet pressures to said operating means in a manner to adjust said regulating valve in accordance with sensed pressure differences, said last named means including a pilot valve moving responsively to variations in inlet pressure, said pilot valve responding to inlet pressure decreased to a predetermined low value to vent the outlet pressure applied to said operating means and responding to inlet pressure decreased below said predetermined low value to vent the inlet pressure applied to said operating means.

2. Valve apparatus according to claim 1, said pilot valve controlling the application of inlet pressure to said operating means and controlling the venting of applied pressures whereby said regulating valve will move to a fully open position upon said inlet pressure decreasing to said predetermined low value and will move to a fully closed position upon said inlet pressure dropping below said predetermined low value.

3. Valve apparatus according to claim 2, inlet pressure being applied in said pilot valve in a direction to urge said pilot valve to reduce the flow of pressure fluid from said inlet to said operating means and to block venting of fluid pressures applied to said operating means, and yielding means urging said pilot valve in a direction in opposition to applied inlet pressure, said pilot valve being constructed for sequential venting of the pressures applied to said operating means in a course of movement influenced by said yielding means.

4. Valve apparatus according to claim 3, characterized by means for opening and closing communication of said inlet with said pilot valve, said yielding means in the absence of communicated inlet pressure setting said pilot valve in position to vent both fluid pressures applied to said operating means.

5. Valve apparatus according to claim 4, said housing having a through opening therein accommodating said regulating valve, passages in said housing on opposite sides of said valve communicating in the one instance directly with said operating means and in the other instance indirectly with said operating means by way of said pilot valve.

6. Valve apparatus according to claim 5, said regulating valve being a butterfly valve mounted on a rotary shaft positioning transversely of said through opening, said operating means including a rod and piston means acting on said shaft, and means external to said housing to signal the operating position of said butterfly valve and to provide for an overriding manual positioning thereof.

7. Valve apparatus according to claim 6, said operating means providing a cylinder for the reciprocation of said piston means therein, springs in said cylinder providing said continuously unbalanced forces, said cylinder on one side of said piston means therein providing for communication with said outlet and for communication with ambient surroundings by way of said pilot valve and on the other side of said piston means therein providing for communication with said inlet by way of said pilot valve and for communication with ambient surroundings by way of said pilot valve.

8. Valve apparatus according to claim 7, a passage leading from said outlet to said cylinder and a passage leading from said pilot valve to said cylinder both having orifice means installed therein.

* * * * *